US 6,749,348 B2

(12) United States Patent
Seita

(10) Patent No.: US 6,749,348 B2
(45) Date of Patent: Jun. 15, 2004

(54) FOCAL-PLANE SHUTTER FOR DIGITAL STILL CAMERA

(75) Inventor: Masato Seita, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 10/627,750

(22) Filed: Jul. 28, 2003

(65) Prior Publication Data
US 2004/0018015 A1 Jan. 29, 2004

(30) Foreign Application Priority Data
Jul. 29, 2002 (JP) ....................... 2002-220108

(51) Int. Cl.⁷ ............................... G03B 9/40
(52) U.S. Cl. .................. 396/443; 396/469; 396/484; 348/362
(58) Field of Search ................ 396/443, 463, 396/465, 466, 469, 483–492; 348/362

(56) References Cited

U.S. PATENT DOCUMENTS 4,657,366 A * 4/1987 Tanabe et al. .............. 396/456
5,150,141 A * 9/1992 Uematsu .................... 396/358
6,536,962 B2 * 3/2003 Takahashi .................. 396/466

FOREIGN PATENT DOCUMENTS

| JP | 2000-314906 | 11/2000 |
| JP | 2001-188280 | 7/2001 |
| JP | 2002-055378 | 2/2002 |
| JP | 2002-055379 | 2/2002 |

* cited by examiner

Primary Examiner—W. B. Perkey
(74) Attorney, Agent, or Firm—Pillsbury Winthrop LLP

(57) ABSTRACT

A first blade is made up of two arms and three blades supported by the arms, wherein one of the arms is rotated in the clockwise direction by a driving pin pressing a pressed portion thereof only when a first-blade driving member is rotated by the force from a driving spring, and the other arm is reciprocally rotated by an output pin fit to a slot when a motor is reciprocally rotated. A second blade is made up of two arms and three blades supported by the arms, wherein one of the arms is reciprocally rotated by a driving pin fit to a slot when a second-blade driving member is reciprocally rotated. One of two action methods can be selected by determining a driving sequence for the first-blade driving member and the motor as to the first blade. Thus, the present invention provides a focal-plane shutter for a digital still camera which can take a picture with both the normally-open method and the normally-closed method.

9 Claims, 12 Drawing Sheets

FOCAL-PLANE SHUTTER FOR DIGITAL STILL CAMERA

BACKGROUND OF THE INVENTION

1. Field of the Invention

The present invention relates to a focal-plane shutter for a digital still camera.

2. Description of the Related Art

As an example of focal-plane shutters for digital still cameras, an arrangement is known wherein a space between a shutter base plate and an auxiliary base plate is partitioned into two blade rooms, two shutter blades, which are referred to a first blade and a second blade, are disposed in these blade rooms, respectively, and exposure is continuously performed on an imaging face in the shape of a rectangle through a slit formed by these shutter blades at the time of taking a picture. Furthermore, examples of digital still cameras include an arrangement having only an optical finder, an arrangement having only an electronic finder (using a monitor as a finder), and an arrangement having both. Accordingly, the aforementioned focal-plane shutters can be classified into normally-open types and normally-closed types depending upon the difference of action, with different configurations being employed according to the difference in the type of the shutter.

On the other hand, as a focal-plane shutter for a digital still camera, an arrangement is known wherein one blade room is formed between the shutter base plate and the auxiliary base plate, and one shutter blade is disposed in the blade room. Examples of the above-described shutter include an arrangement wherein following the end of exposure for photography, the photography optical path is simply temporarily closed by the shutter blade, and an arrangement wherein the exposure time period for photography is ended by the closing action of the shutter blade. In either case, the focal-plane shutters can be classified into normally-open types and normally-closed types, with different configurations being employed according to the difference in the type of the shutter.

Furthermore, each shutter blade has essentially the same configuration regardless of whether a focal-plane shutter including two shutter blades or a focal-plane shutter including only one shutter blade. The focal-plane shutter comprises multiple arms mounted on the shutter base plate and one or more blades supported by these arms. In the event that the arms are reciprocally rotated in a predetermined range of angle, the blades are moved between the position where the photography optical path is closed by the blades and the position retracted from the optical path.

There is the need to employ a focal-plane shutter having a configuration corresponding to whether the normally-closed method or the normally-open method, regardless of whether the focal-plane shutter including two shutter blades and the focal-plane shutter including only one shutter blades. This restriction is by no means preferable from the point of development of the camera and manufacturing of the shutter. Accordingly, development of a focal-plane shutter which can be employed in both cameras employing the normally-open method and cameras employing the normally-closed method with the same shutter configuration is desired. Furthermore, development of such a focal-plane shutter is desired since that would allow for a camera to be developed wherein the user can take a picture with the normally-open method and the normally-closed method being selected.

SUMMARY OF THE INVENTION

The present invention has been made to solve the above-described problems, and accordingly it is an object thereof to provide a focal-plane shutter for a digital still camera for taking a picture both with the normally-open method and the normally-closed method, with the same configuration.

In order to achieve the above objects, a focal-plane shutter for a digital still camera according to the present invention comprises a first base plate having a first aperture for a photography optical path; a second base plate, having a second aperture for a photography optical path which matches the first aperture, for forming a blade room between the first base plate and the second base plate; a plurality of arms mounted on one of the first and second base plates; a shutter blade made up of one or more blades, supported by the plurality of arms, which is reciprocally moved between a first position where the shutter blade is retracted from the photography optical path and a second position where the shutter blade covers the photography optical path in the blade room; a driving member, mounted on the first base plate outside the blade room, which presses one of the arms only at the time of action by the force from a driving spring so that the shutter blade is moved in a first direction; a motor, mounted on the second base plate outside the blade room, which moves the shutter blade in the first direction and in a second direction, through one of the plurality of arms corresponding to reciprocal rotation of the stator of the motor; a set member, mounted on the first base plate outside the blade room, which moves from an initial position so that the driving member is moved to a set position against the force from the driving spring; and holding means which hold the driving member at a set position at least during movement of the set member for returning to a set position, with the holding force thereof being released during the movement of the shutter blade by the force from the driving spring. In this case, an arrangement may be made wherein the arm operated by the driving member and the arm operated by the motor is the same arm, whereby a preferable configuration is obtained.

With the focal-plane shutter for a digital still camera according to the present invention, a current may be continuously applied to the motor so that the shutter blade is forced so as to move in the second direction from the point in time at which the movement of the shutter blade in the second direction is started, up to the point in time at which the shutter blade reaches a second position following which a predetermined time period elapses, thereby preventing the shutter blade from bounding at the second position. Furthermore, the current may be continuously applied to the motor from the point in time at which the movement of the shutter blade in the first direction is started up to the point in time immediately before the shutter blade reaching the first position, obtaining stable movement of the shutter blade in the first direction.

Furthermore, with the focal-plane shutter for a digital still camera according to the present invention, a current may be applied to the motor so that the shutter blade is forced so as to move in the first direction, from the point in time at which the movement of the shutter blade in the first direction is started, at least up to the point in time at which the shutter blade is stopped at the first position by coming into contact with a stopper, thereby preventing the shutter blade from bounding at the first position.

Furthermore, the focal-plane shutter for a digital still camera according to the present invention may further comprise: an intermediate plate, having a third aperture which matches the first and second apertures for the photography optical path, which partitions a space between the first base plate and the second base plate into two blade rooms so that the shutter blade is disposed in one of the two blade rooms; a second shutter blade, made up of one or more blades and supported by a plurality of arms mounted on one of the two base plates, which is reciprocally moved between a first position where the shutter blade covers the photography optical path and a second position where the shutter blade is retracted from the photography optical path in the other blade room of the two blade rooms; a second driving member, mounted on the first base plate outside the blade room, which moves the second shutter blade in a first direction at the time of being moved by the force from a second driving spring, and moves the second shutter blade in a second direction at the time of being moved to a set position by the set member against the force from the second driving spring; and second holding means which hold the second driving member at a set position at least during movement of the set member for returning to the initial position, with the holding force thereof being released during the movement of the second shutter blade by the force from the second driving spring.

According to the present invention, the first shutter blade may be a front blade, and the second shutter blade may be a rear blade.

With the present invention, shutter action can be performed with both the normally-open method and the normally-closed method, with the same configuration, regardless of whether a focal-plane shutter including two shutter blades or a focal-plane shutter including only one shutter blade. This advantage is preferable from the point of development of the camera and manufacturing of the shutter, and furthermore would allows for a camera to be developed wherein the user can take a picture with the normally-open method and the normally-closed method being selected.

This and other objects as well as the features and advantages of the present invention will become apparent from the following detailed description when taken in conjunction with the accompanying drawings.

DESCRIPTION OF THE PREFERRED EMBODIMENTS

Each embodiment described below has a configuration wherein shutter action can be performed with both the normally-open method and the normally-closed method. Thus, these embodiment can be employed in a camera for taking a picture with only the normally-open method, a camera for taking a picture with only the normally-closed method, and a camera for taking a picture with both the normally-open method and the normally-closed method.

FIGS. 1 through 8 are diagrams for describing a first embodiment, and FIGS. 9 through 12 are diagrams for describing a second embodiment. For description, in principle, with a focal-plane shutter assembled within a camera, the side of the camera toward the photography lens will be referred to as "front side", and the side of the camera toward the imaging device will be referred to "back side", hereafter.

First Embodiment

Figure 1:
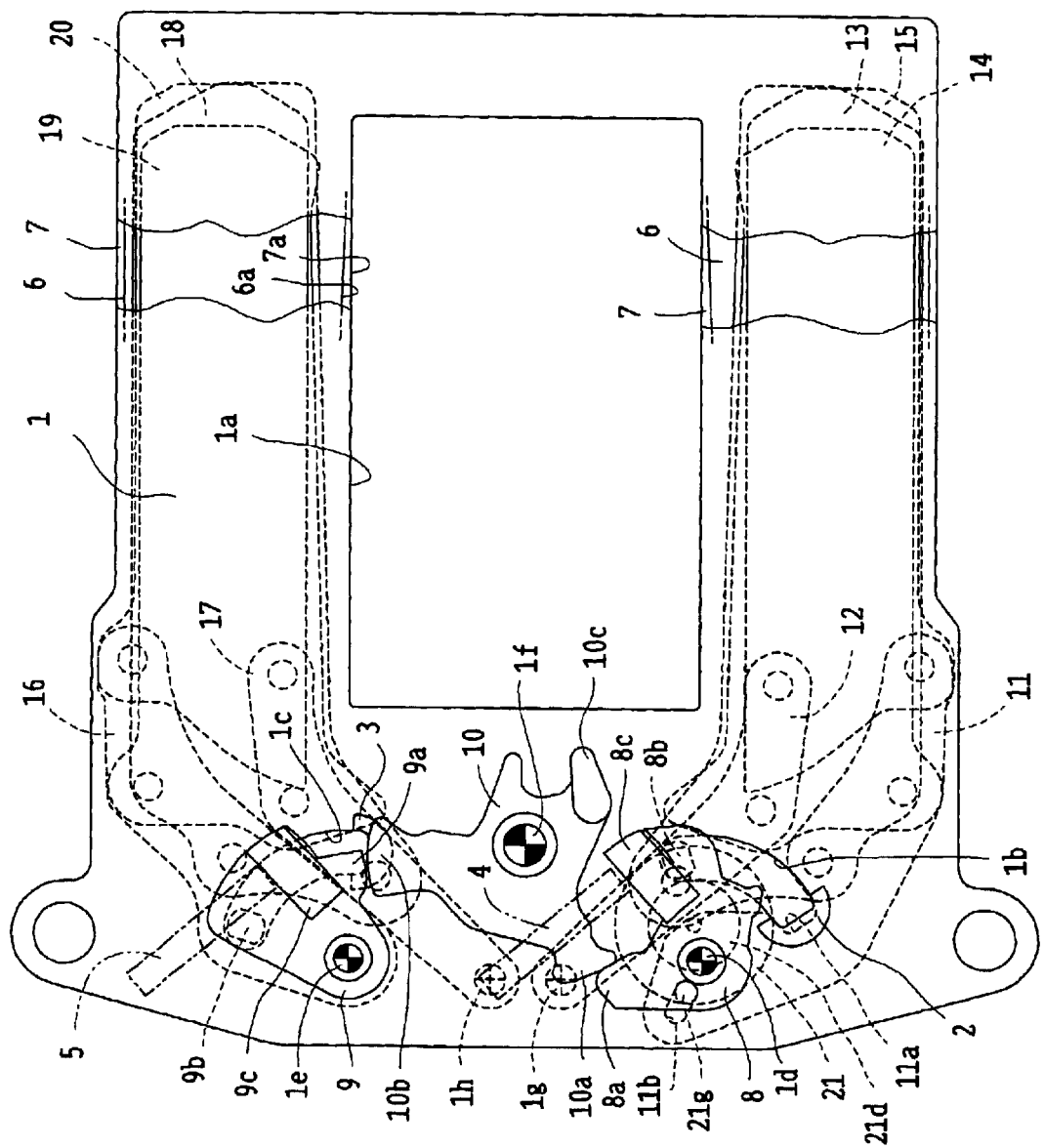
FIG. 1 is a plan view which illustrates a set state in a case of taking a picture with the normally-open method according to a first embodiment of the present invention.

As shown in FIG. 1, a shutter base plate 1 has an aperture 1*a* in the shape of a rectangle for a photography optical path generally in the center thereof. Furthermore, two slots 1*b* and 1*c* are formed in the shape of an arc on the left side of the aperture 1*a*, and the known rubber cushion members 2 and 3 in a planer C-shape are mounted on the bottom ends of these slots 1*b* and 1*c*. Furthermore, shafts 1*d*, 1*e*, and 1*f* are erected on the front side of the shutter base plate 1, and shafts 1*g* and 1*h* are erected on the back side thereof. The shafts 1*d* and 1*e* pass through the shutter base plate 1 so as to erect on the back side thereof, as well. Furthermore, known support plates are mounted to the tip ends of the shafts 1*d*, 1*e*, and 1*f*, which are not shown in the drawings. Electromagnets for a first blade and a second blade are mounted on the faces of the support plates on the front side of the shutter base plate 1, though only the iron cores 4 and 5 of these electromagnets are indicated by alternate long and two short dashes lines in FIG. 1, for the sake of simplifying the drawing.

Figure 2:
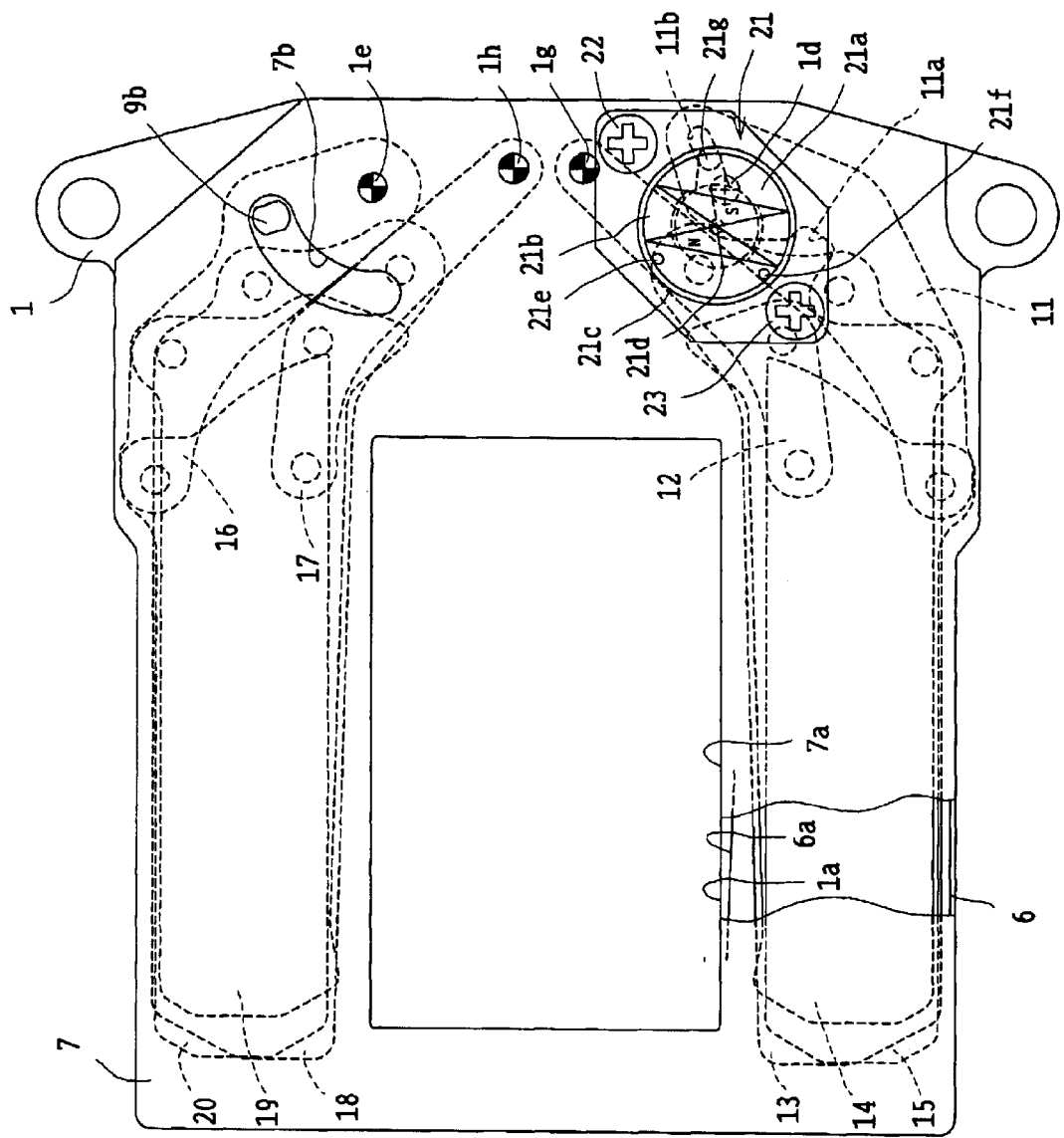
FIG. 2 is a rear view of FIG. 1.

An intermediate plate 6 (which is a known component, so is not shown in full, within only a part thereof being shown in FIGS. 1 and 2) and an auxiliary base plate 7 are mounted with unshown appropriate means at predetermined intervals on the back side of the shutter base plate 1, in that order. The space between the shutter base plate 1 and the intermediate plate 6 forms a blade room for the second blade, and a space between the intermediate plate 6 and the auxiliary base plate 7 forms a blade room for the first blade. Furthermore, apertures 6*a* and 7*a* are formed for a photography optical path at positions where the aperture 1*a* of the shutter base plate 1 matches the intermediate plate 6 and the auxiliary base plate 7, respectively. As is well known, the aperture 6a of the intermediate plate 6 is formed with the upper and lower sides not in the shape of a straight line, but in the shape of an angle. Furthermore, the auxiliary base plate 7 of the present embodiment shown in FIG. 2 is formed in a shape somewhat different from a known auxiliary base plate. However, specific description will be made later along with the configuration of components mounted on the auxiliary base plate 7.

A first-blade driving member 8 formed of plastic is rotatably mounted to the shaft 1d on the front side of the shutter base plate 1, and is forced so as to rotate in the clockwise direction by an unshown known first-blade driving spring. The first-blade driving member 8 comprises a pressed portion 8a, a driving pin 8b, and a mounting portion 8c. The driving pin 8b passes through the slot 1b of the shutter base plate 1, and protrudes into the blade room. On the other hand, while the mounting portion 8c is well-known, so is not shown in the drawings, an iron-piece member is mounted inside the mounting portion 8c by a spring. The iron-piece member is designed so as to be attracted to the iron core 4 of the unshown electromagnet for first blade mounted on the aforementioned support plate as disclosed in Japanese Unexamined Patent Application Publication No. 2002-55379, and accordingly, the first-blade driving member 8 is held at the action-start position against the force from the first-blade driving spring.

A second-blade driving member 9 formed of plastic is rotatably mounted to the shaft 1e on the front side of the shutter base plate 1, and is forced so as to rotate in the clockwise direction by an unshown known second-blade driving spring. The second-blade driving member 9 comprises a pressed portion 9a, a driving pin 9b, and a mounting portion 9c. The driving pin 9b passes through the slot 1c of the shutter base plate 1 so as to protrude into the blade room. On the other hand, the mounting portion 9c is formed in a shape similar to the aforementioned mounting portion 8c, and an iron-piece member (not shown) is secured inside the mounting portion 9c by a spring so as to be attracted to the iron core 5 of the electromagnet for second blade mounted to the aforementioned support plate.

Furthermore, a set member 10 formed of plastic is rotatably mounted to the shaft 1f of the shutter base plate 1. The set member 10 has pressing portions 10a and 10b, and a pressed portion 10c. The pressing portion 10a presses the pressed portion 8a of the first-blade driving member 8, and the pressing portion 10b presses the pressed portion 9a of the second-blade driving member 9.

Furthermore, the set member 10 is forced so as to rotate in the counterclockwise direction by a return spring (not shown). FIG. 1 illustrates a state wherein the set member 10 is rotated in the clockwise direction against the forced force, and the two driving members 8 and 9 are rotated in the counterclockwise direction against the forced force from the driving springs, whereby these members are kept stationary at a set position.

Next, description will be made regarding a configuration of the first blade and the second blade. As described above, the first blade is disposed between the intermediate plate 6 and the auxiliary base plate 7. The first blade comprises two arms 11 and 12 each end of which are secured to the shafts 1d and 1g, and three blades 13, 14, and 15, supported by the arms toward the tip ends thereof, in that order. The blade 15 supported at the forefront serves as a blade for forming a slit. With the arm 11, a recessed-shaped pressed portion 11a (more readily understood with FIG. 2) and a slot 11b are formed. The pressed portion 11a can be pressed in the clockwise direction by the driving pin 8b of the first-blade driving member 8. With the first blade, the arms 11 and 12 are disposed at positions the closest to the side of the auxiliary base plate 7, and the blades 15, 14, and 13, are disposed toward the intermediate plate 6 in that order.

On the other hand, the second blade is disposed between the shutter base plate 1 and the intermediate plate 6. The second blade comprises two arms 16 and 17 each end of which are secured to the shafts 1e and 1h, and three blades 18, 19, and 20, supported by the arms toward the tip ends thereof, in that order. The blade 20 supported at the forefront of the arms 16 and 17 serves as a blade for forming a slit. The driving pin 9b of the second-blade driving member 9 is fit to a known slot formed on the arm 17. Accordingly, the arm 16 of the second blade is formed in a shape different from the shape of the arm 11 of the first blade. However, the second blade has generally the same configuration as with the first blade, and the components thereof are disposed in an arrangement wherein components the same as with first blade are in reverse order. Accordingly, in a case of the second blade, the arms 16 and 17 are disposed at positions the closest to the side of the shutter base plate 1, and the blades 20, 19, and 18, are disposed toward the intermediate plate 6, in that order.

Next, description will be made regarding the specific shape of the auxiliary base plate 7 and components mounted thereon primarily with reference to FIG. 2. The auxiliary base plate 7 is formed of plastic, wherein the aforementioned aperture 7a is formed generally in the center portion thereof, and a slot 7b is formed in the shape of an arc at the upper-right portion of the aperture 7a. The slot 7b is formed in a shape corresponding to the slot 1c formed on the shutter base plate 1, and tip end portion of the driving pin 9b is inserted thereto. Furthermore, four openings are formed at the right portion of the aperture 7a, the shafts 1d, 1e, 1g, and 1h, of the shutter base plate 1 are inserted thereto.

Furthermore, a current-controlled motor 21, which is referred to as "moving-magnet motor", is secured to the auxiliary plate 7 with screws 22 and 23. The motor 21 is configured so that a stator made up of a permanent magnet reciprocally rotates in a predetermined range of angle corresponding to the current direction for a stator coil. While conventionally, such a motor is generally employed for a lens shutter, various proposals have been made with regard to an arrangement wherein the motor is employed in a focal-plane shutter as disclosed in Japanese Unexamined Patent Application Publication No. 2001-188280, for example. While there is no need to make specific description regarding to a configuration of such a kind of the motor, description thereof will be made in brief as far as shown in FIG. 2.

The stator comprises a cage-shaped stator frame 21a, a coil 21b wound on grooves formed on the stator frame 21a, a cylinder-shaped yoke 21c which is fit to the outside of the stator frame 21a with the coil 21b wounded thereupon, two iron pins 21e and 21f secured at positions facing to the circumference of the stator 21d. Furthermore, the stator 21d formed of a permanent magnet has been magnetized into the two poles in the radial direction, is rotatably borne by the stator frame 21a, and the aforementioned coil 21b is wound so as to surround the bearing portion. Furthermore, an output pin 21g extending parallel to the rotational axis of the rotator 21d is provided at a position protruding from the rotator 21d in the diameter direction. The output pin 21g passes through unshown openings formed on the stator frame 21a and the auxiliary base plate 7, and is fit to the slot 11b on the arm 11 in the blade room.

Next, description will be made regarding to the operations of the present embodiment. As described above, with the focal-plane shutter of the present embodiment, photography can be performed with both the normally-open method and the normally-closed method. First of all, description will be made regarding a case of taking a picture with the normally-open method, with reference to FIGS. 1 through 6. FIG. 1 illustrates the set state in a case of taking a picture with the normally-open method. At this time, the set member 10 is prevented from returning to the initial position (rotation in the counterclockwise direction) by the unshown member on the side of the camera main unit. Accordingly, the first-blade driving member 8 and the second-blade driving member 9 are prevented from rotating in the clockwise direction due to the force from the unshown first-blade driving spring and the second-blade driving spring by the pressing portions 10a and 10b of the set member 10, and each of the unshown iron-piece members mounted to the mounting portions 8c and 9c are in contact with the iron cores 4 and 5 of the electromagnet for first blade and the electromagnet for second blade.

Also, at the same time, the first blade is forced so that the arm 11 rotates in the clockwise direction owing to a reason described later, and accordingly, the pressed portion 11a and the driving pin 8b of the first-blade driving member 8 are not into contact with each other, and are greatly distanced one from another. Accordingly, the three blades of the first blade 13 through 15 are stored at the lower portion of the aperture 1a with these blades being overlaid on each other. On the other hand, with the second blade, the arm 16 is rotated in the counterclockwise direction along with the driving pin 9b of the second-blade driving member 9, and accordingly, the three blades 18 through 20 are stored at the upper portion of the aperture 1a with the three blades being overlaid on each other. Accordingly, with any type of such a camera, upon turning on the electric power of the camera, the user can observe the subject on a monitor, except for an arrangement wherein the focal-plane shutter is employed in a single-lens reflex camera including a movable mirror.

Now, description will be made regarding the reason why the arm 11 of the first blade is forced so as to rotate in the clockwise direction in FIG. 1. As shown in FIG. 2, in the set state, the iron pin 21e faces the circumference of the N pole of the rotator 21d, and the iron pin 21f faces the circumference of the S pole. However, the distance between the central-angular position of the N pole (the position offset from the magnetic boundary by 90°) and the iron pin 21e is less than the distance between the central-angular position of the S pole and the iron pin 21f, and accordingly, attraction between the iron pin 21e and the N pole is greater than with the other, and consequently, the rotator 21d is forced so as to rotate in the counterclockwise direction in FIG. 2. Accordingly, even in the event that the coil 21b is off, the arm 11 connected to the output pin 21g of the rotator 21d is forced so as to rotate in the clockwise direction in FIG. 1. However, rotation of the arm 11 is prevented by an unshown stopper.

In the above-described set state, in the event of turning on the electric power of the camera, upon pressing the release button of the camera for taking a picture, unshown coils of the electromagnet for first blade and the electromagnet for second blade are turned on, and a positive current is applied to the coil 21b of the motor 21. Accordingly, on the one hand, unshown iron members secured to the first-blade driving member 8 and the second-blade driving member 9 are attracted and held by the iron cores 4 and 5. Accordingly, an unshown member on the side of the camera main unit retracts from the pressed portion 10c of the set member 10, and thus, the set member 10 returns to the initial position by the force from an unshown return spring.

Figure 3:
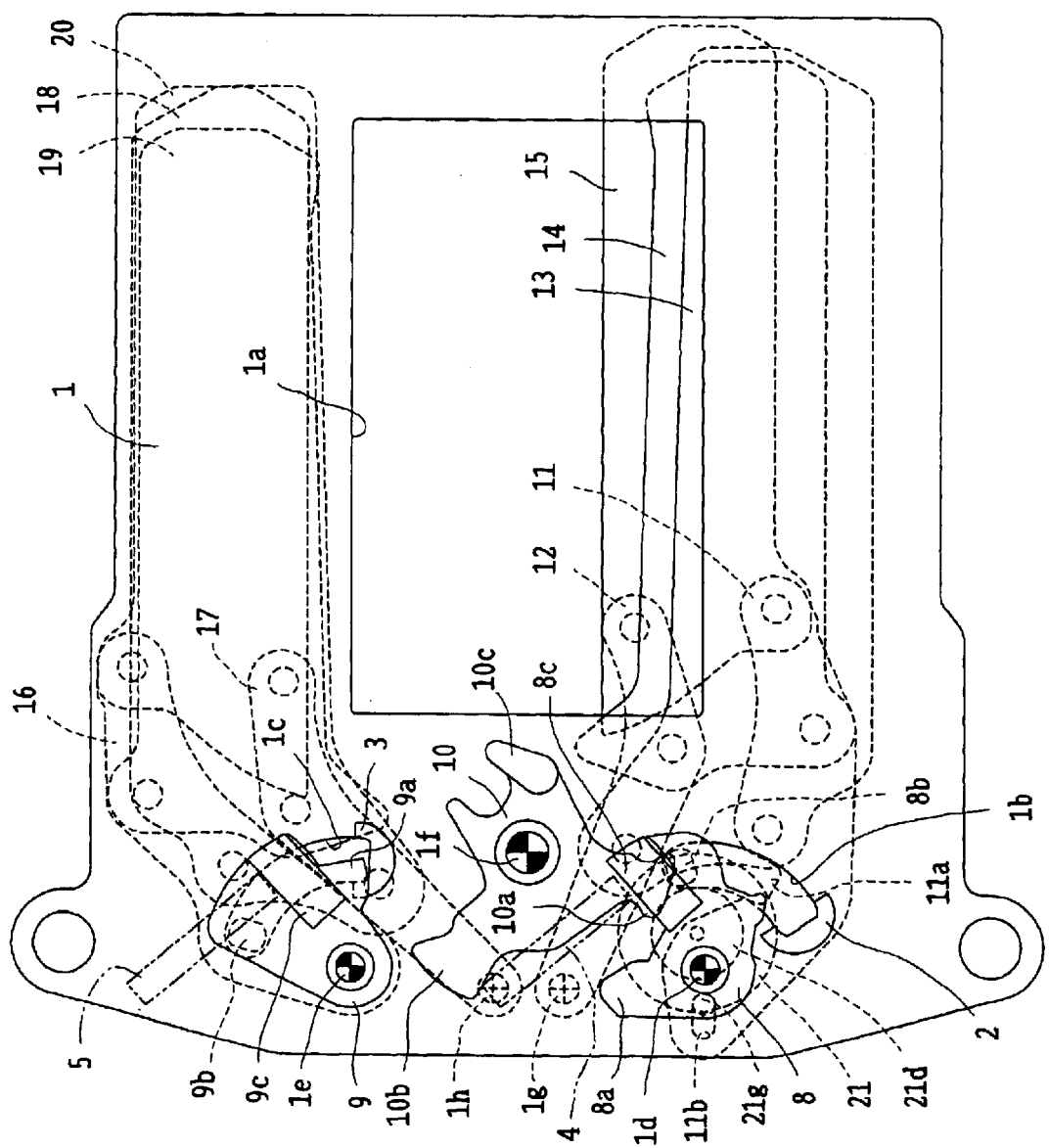
FIG. 3 is a plan view which illustrates an intermediate state in an early stage of photography wherein a first blade is being moved from the position shown in FIG. 1 up to an exposure action start position.
Figure 4:
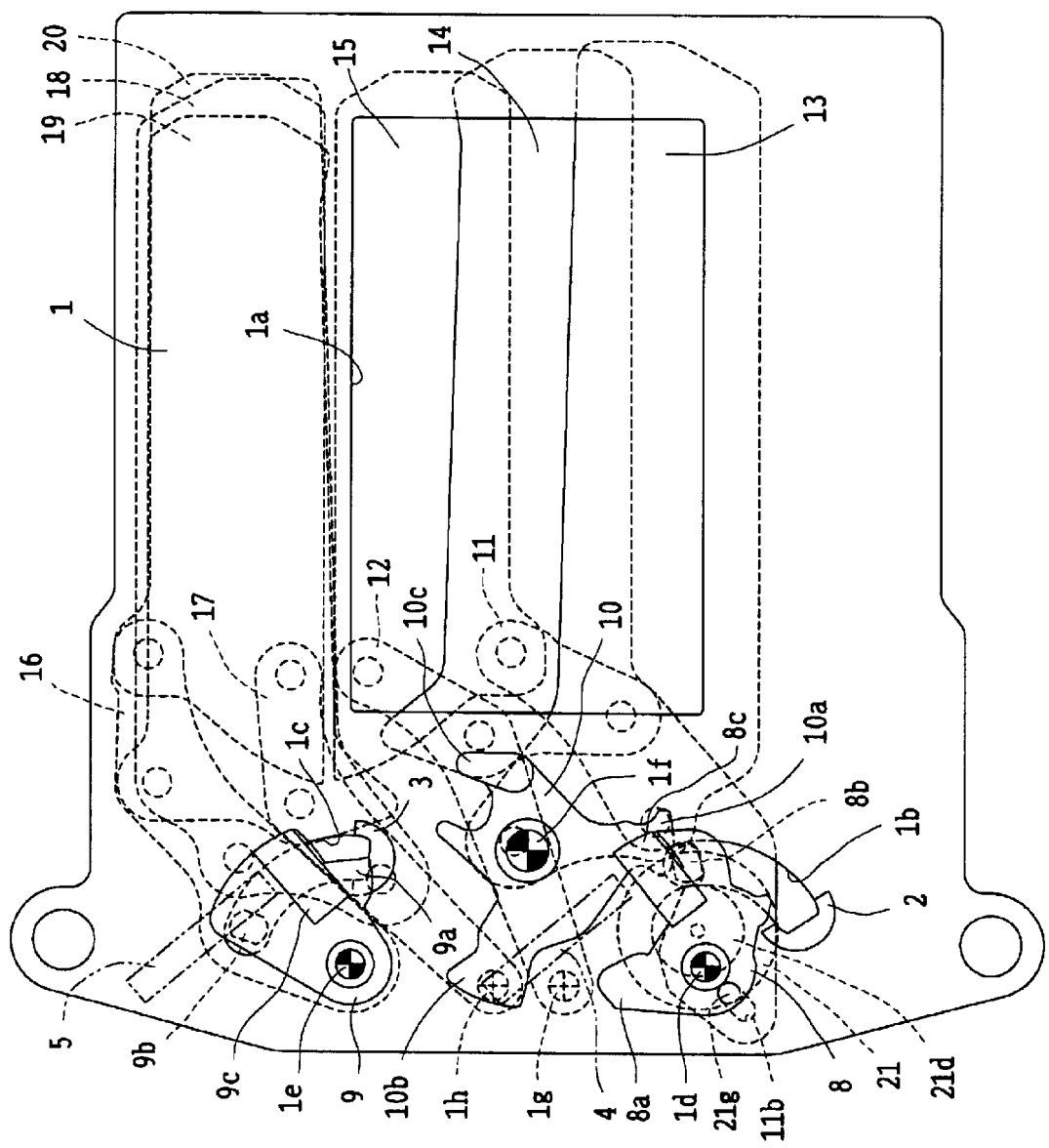
FIG. 4 is a plan view which illustrates a state wherein the first blade has reached the exposure action start position from the position shown in FIG. 3.

Furthermore, on the other hand, the rotator 21d of the motor 21 is rotated in the counterclockwise direction in FIG. 1, and accordingly, the arm 11 is rotated in the counterclockwise direction, as well. Accordingly, the three blades 13 through 15 of the first blade are moved upward while reducing the overlap of the blades on top of each other, whereby the first blade covers the photography optical path. The intermediate situation of such an action is shown in FIG. 3. At this time, the set member 10 has already reached the initial position, and is in contact with the unshown stopper, whereby the set member 10 is stationary. The action of the first blade performed described above is stopped by the pressed portion 11a of the arm 11 coming into contact with the driving pin 8b of the first-blade driving member 8, and also, the photography optical path is closed by the three blades 13 through 15. FIG. 4 illustrates this state. In FIG. 4, reference numeral for the pressed portion 11a is omitted.

Figure 6:
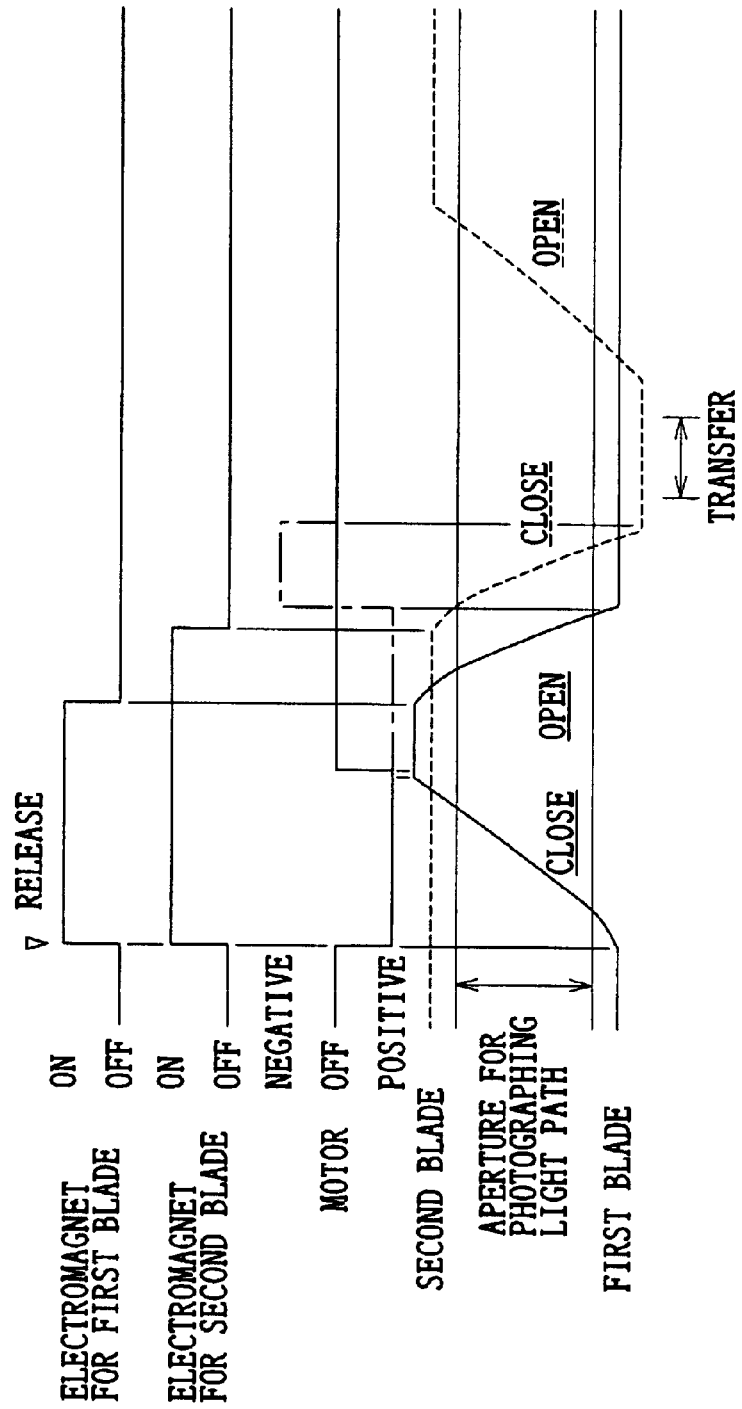
FIG. 6 is a timing chart which indicates the relation between a series of electric control and action of two shutter blades in a case of taking a picture with the normally-open method according to the first embodiment.
Figure 12:
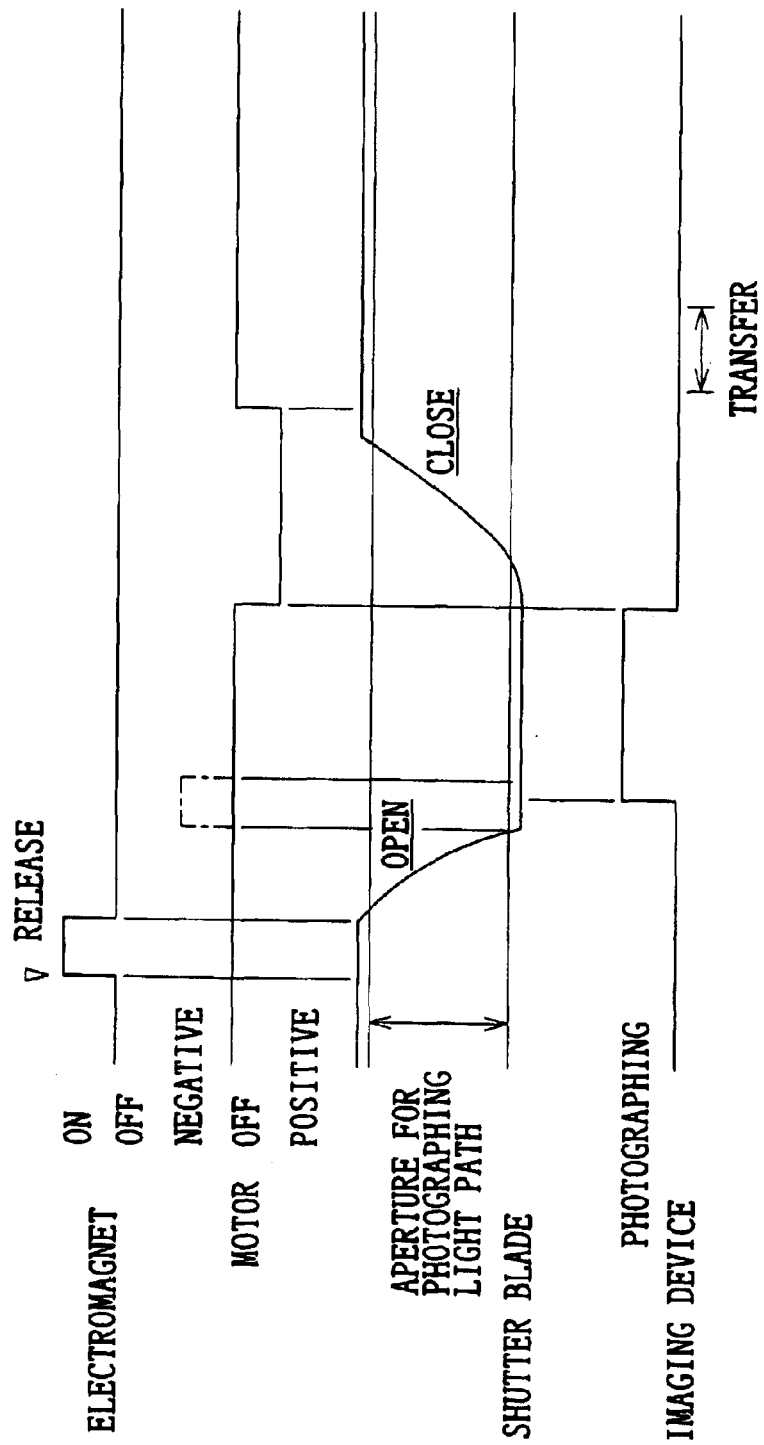
FIG. 12 is a timing chart which indicates the relation between a series of electric control and action of two shutter blades in a case of taking a picture with the normally-closed method according to the second embodiment.

At this time, a positive current is turned off for the coil 21b of the motor 21. However, as shown in FIG. 6, the timing of the turning off is designed so as to be delayed by a predetermined time period from the timing where the arm 11 comes into contact with the driving pin 8b. This is because the arm 11 is forced in the counterclockwise direction during a predetermined time period due to the above-described sequence, and accordingly, bounding of the first blade is prevented, thereby obtaining a stable state at an early stage. Thus, even in the event that a positive current is turned off for the coil 21b after a predetermined time period, the rotator 21 can be kept stationary. This is because the rotator 21d of the motor 21 is rotated in the counterclockwise direction from the state shown in FIG. 1, so the distance between the central angular position of the S pole and the iron pin 21f is less than the distance between the central angular position of the N pole and the iron pin 21e as shown in FIG. 12, and consequently, the rotator 21d is forced so as to rotate in the counterclockwise direction in FIG. 4.

As described above, following a predetermined time period from reaching the state shown in FIG. 4, a positive current is turned off for the coil 21b of the motor 21, and thus the camera having such a configuration has the advantage of saving electric power. In this case, no current is applied to the coil 21b until the next picture is taken. However, an arrangement may be made wherein even following the aforementioned predetermined time period, a positive current is continuously applied to the coil 21b. In some cases, such an arrangement has advantages. In FIG. 6, a primary case of performing control wherein following a predetermined time period after the state shown in FIG. 4, a positive current is turned off for the coil 21b is denoted by a solid line, and a special case of performing control wherein even following the aforementioned time period, a positive current is continuously applied to the coil 21b is denoted by an alternate long and short dashed line. Description will be made hereafter assuming that such special control is performed. Note that the primary operation of the present embodiment can be fully understood even from such a description.

As described above, after reaching the state shown in FIG. 4, first of all, a current is turned off for the electromagnet for first blade, and subsequently, a current is turned off for the electromagnet for second blade so that shutter action of the first blade and the second blade is consecutively performed, whereby exposure is performed on the imaging face of the imaging device through a slit formed of the open edge of the slit forming blade 15 and the close edge of the slit forming blade 20. That is to say, first of all, upon turning off a current for the electromagnet for first blade, the iron core 4 lose the holding force. At this time, a positive current is applied to the coil 21b of the motor 21, and accordingly, the arm 11 of the first blade is forced so as to rotate in the counterclockwise direction by the rotator 21d. However, the force from the unshown first-blade driving spring for rotating the first-blade driving member 8 in the clockwise direction is greater than the aforementioned force from the rotator 21d, the first-blade driving member 8 is rotated in the clockwise direction by the force from the driving spring, and accordingly, the arm 11 is rotated in the clockwise direction by the driving pin 8b. Thus, the three blades 13 through 15 are moved downward while increasing the overlap of the blades on top of each other.

As well known, at that time, the first blade is not simply moved downward, but is moved while being accompanied by a complex action due to the fact that action is performed under an unstable situation of the thin and large-area blades 13 through 15 facing the apertures 6a and 7a, and due to the fact that the two heads of the axes for connecting the arms 11 and 12 and the slit forming blade 13 are pressed into contact with the edge of the aperture 7a of the auxiliary base plate 7. On the other hand, the arm 11 of the first blade is simply in contact with the driving pin unlike the arm 16 of the second blade, and accordingly, the arm 11 could become offset from the driving pin 8b. However, as described above, a positive current is continuously applied to the motor 21, and accordingly, the arm 11 is forced so as to rotate in the counterclockwise direction, so the above-described trouble is completely prevented, and thus, stable action can be continuously performed.

Subsequently, at the same time as or immediately following the slit forming blade 15 completely retracting from the photography optical path, a current is applied for driving in the reverse direction. Accordingly, the arm 11 is forced so as to rotate in the clockwise direction, but at that time, the speed of the first blade becomes considerably great due to acceleration, and accordingly, the application of the current does not substantially have influence on the action of the first blade. Furthermore, immediately following the application of the current, the first-blade driving member 8 is stopped by the driving pin 8b coming into contact with the cushion member 2.

However, at that time, the driving pin 8b compresses the cushion member 2 with great force, and subsequently, is somewhat returned with the elasticity of the cushion member 2, whereby the first-blade driving member 8 is stopped. Accordingly, at the time of the driving pin 8b compressing the cushion member 2 maximally, the arm 11 does not yet come into contact with the aforementioned unshown stopper (the stopper necessary for keeping the first blade at the state shown in FIG. 1). This is because in the event that the arm 11 comes into contact with the stopper prior to this point in time, the arm 11 could be deformed between the stopper and the driving pin 8b, resulting in the first blade being destroyed. Note that the stopper is not restricted to directly coming into contact with the arm 11, and an arrangement may be made wherein the output pin 21g of the motor 21, the arm 12, or any of the blades 13 through 15, directly comes into contact with the stopper. However, with any configuration described above, the same problem is unavoidable.

Accordingly, at the time of stopping the first-blade driving member 8, at the same time that the driving pin 8b comes into contact with the cushion member 2, the arm 11 retracts from the driving pin 8b, and immediately following the action, the arm 11 comes into contact with the stopper with the great impact. Accordingly, the arm 11 bounds greatly due to the impact. Here, as described above, the driving pin 8b compresses the cushion member 2, and subsequently, somewhat returns, whereby the driving pin 8b stops. Accordingly, in the state that the driving pin 8b and the arm 11 are stationary, the gap with a considerable size is caused between the driving pin 8b and the arm 11. Accordingly, in the event that the arm 11 bounds as described above, intense bounding is repeated within the gap with a relatively large size, leading to destruction of the first blade, and furthermore, the tip of the slit forming blade 15 could be temporarily inserted within the photography optical path depending upon the design of the shutter. With this embodiment, as described above, at the final stage of the exposure action of the first blade, a negative current is applied to the coil 21b for rotating the rotator 21d, i.e., in the clockwise direction, whereby the bounding is suitably prevented. Following the stop of the first blade, the current is turned off for the coil 21b.

Note that while description has been made above regarding an arrangement wherein even following reaching the state shown in FIG. 4, the same current is continuously applied to the coil 21b, and immediately before the end of the exposure action of the first blade, a negative current is applied to the coil 21b, the present invention is not restricted to such an arrangement, and an arrangement may be made wherein following reaching the state shown in FIG. 4, the coil 21b is turned off, and just before the end of the exposure action of the first blade, a negative current is applied to the coil 21b so as to prevent the above-described bounding, and furthermore, an arrangement may be made wherein even following reaching the state shown in FIG. 4, the same current is applied to the coil 21b, and such an application of the current for preventing the above-described bounding is not performed.

Figure 5:
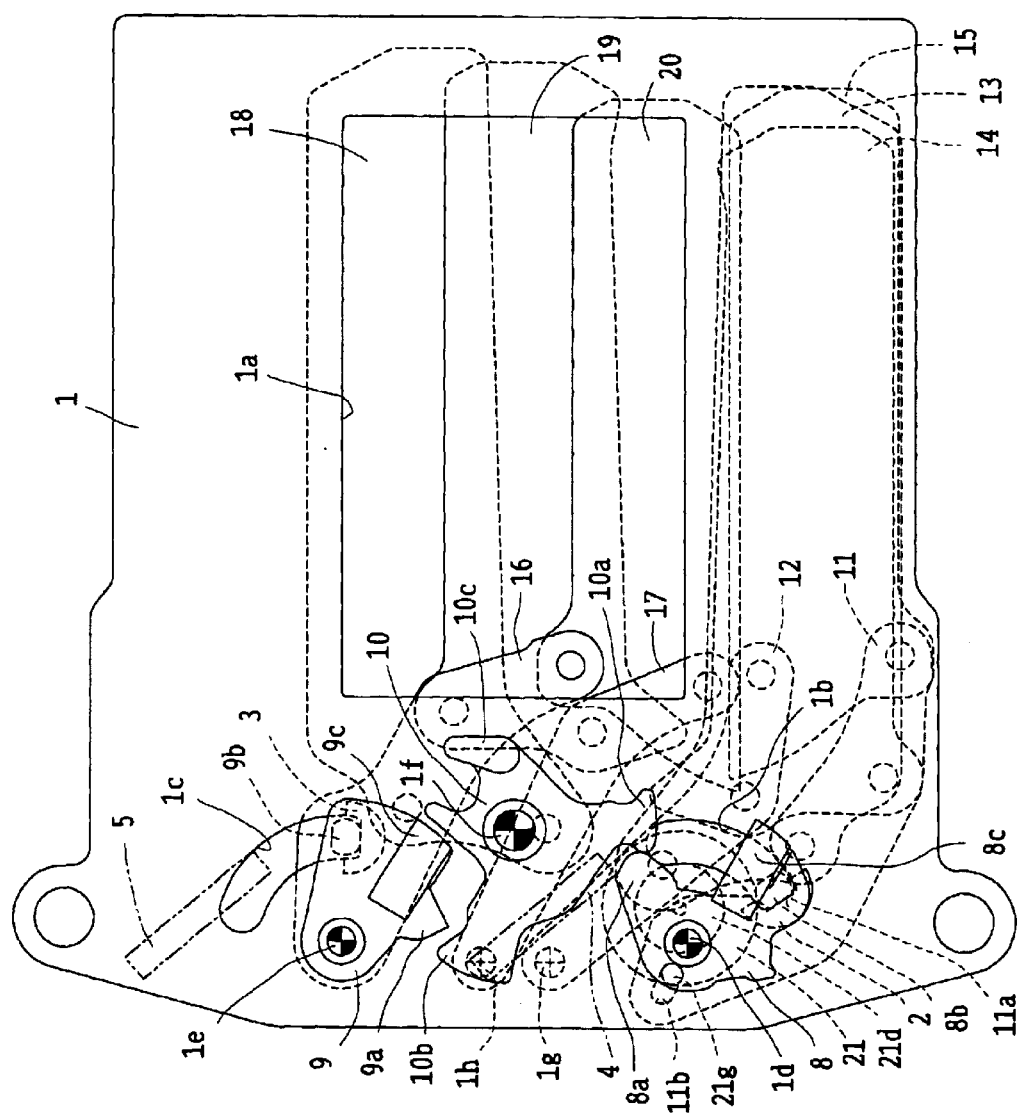
FIG. 5 is a plan view which illustrates a state immediately following the end of exposure action which has been started from the state shown in FIG. 4.

As described above, following turning off the electromagnet for first blade and a predetermined time elapsing, the electromagnet for second blade is turned off according to a signal from the exposure control circuit. Thus, the iron core 5 loses the holding force, the second-blade driving member 9 rotates in the clockwise direction by the force from the unshown second-blade spring, and accordingly, the arm 16 is rotated in the clockwise direction by the driving pin 9b. Thus, the three blades 18 through 20 of the second blade are moved downwards while reducing the overlap of the blades on top of each other. Immediately following these blades 18 through 20 completely covering the photography optical path, the driving pin 9b comes into contact with the cushion member 3 so as to stop, whereby the exposure action of the second blade ends. FIG. 5 illustrates the state immediately following the end of the exposure action of the second blade following with the first blade.

As described above, photography ends, imaging information is transmitted to a recording device with the photography optical path being closed, and immediately following the transmission, set action is started. With the set action, the pressed portion 10c of the set member 10 is pressed by an unshown member on the side of the camera main unit, whereby the set member 10 is rotated in the clockwise direction from the initial position shown in FIG. 5 against the force from an unshown return spring. Upon the set member 10 rotating in the clockwise direction, first of all, the pressing portion 10a thereof presses the pressed portion 8a of the first-blade driving member 8 so that the first-blade driving member 8 is rotated in the counterclockwise direction against the force from the unshown first-blade driving spring. However, at this time, although a current is not applied to the coil 21b of the motor 21, the rotator is forced so as to rotate in the clockwise direction by the above-described means, and accordingly, the arm 11 does not follow the driving pin 8b, whereby the arm 11 is kept in the state shown in FIG. 5.

With the set member 10, immediately following rotation of the first-blade driving member 8, the pressing portion 10b presses the pressed portion 9a of the second-driving member 9 so that the second-blade driving member 9 is rotated in the counterclockwise direction against the force from the unshown second-blade driving spring. Thus, the arm 16 is rotated in the counterclockwise direction by the driving pin 9b of the second-blade driving member 9, whereby the three blades 18 through 20 of the second blade are moved upward while increasing the overlap of the blades on top of each other. Subsequently, the three blades 18 through 20 of the second blade are stored at the upper portion of the aperture 1a with these blades being overlaid with each other, and the unshown iron-piece members mounted to the driving member 8 and 9 come into contact with the iron cores 4 and 5, respectively, so that rotation of the set member 10 due to the unshown member on the side of the camera main unit is stopped, whereby the set action ends. FIG. 1 described above illustrates the state of the end of the set action thus performed.

Figure 7:
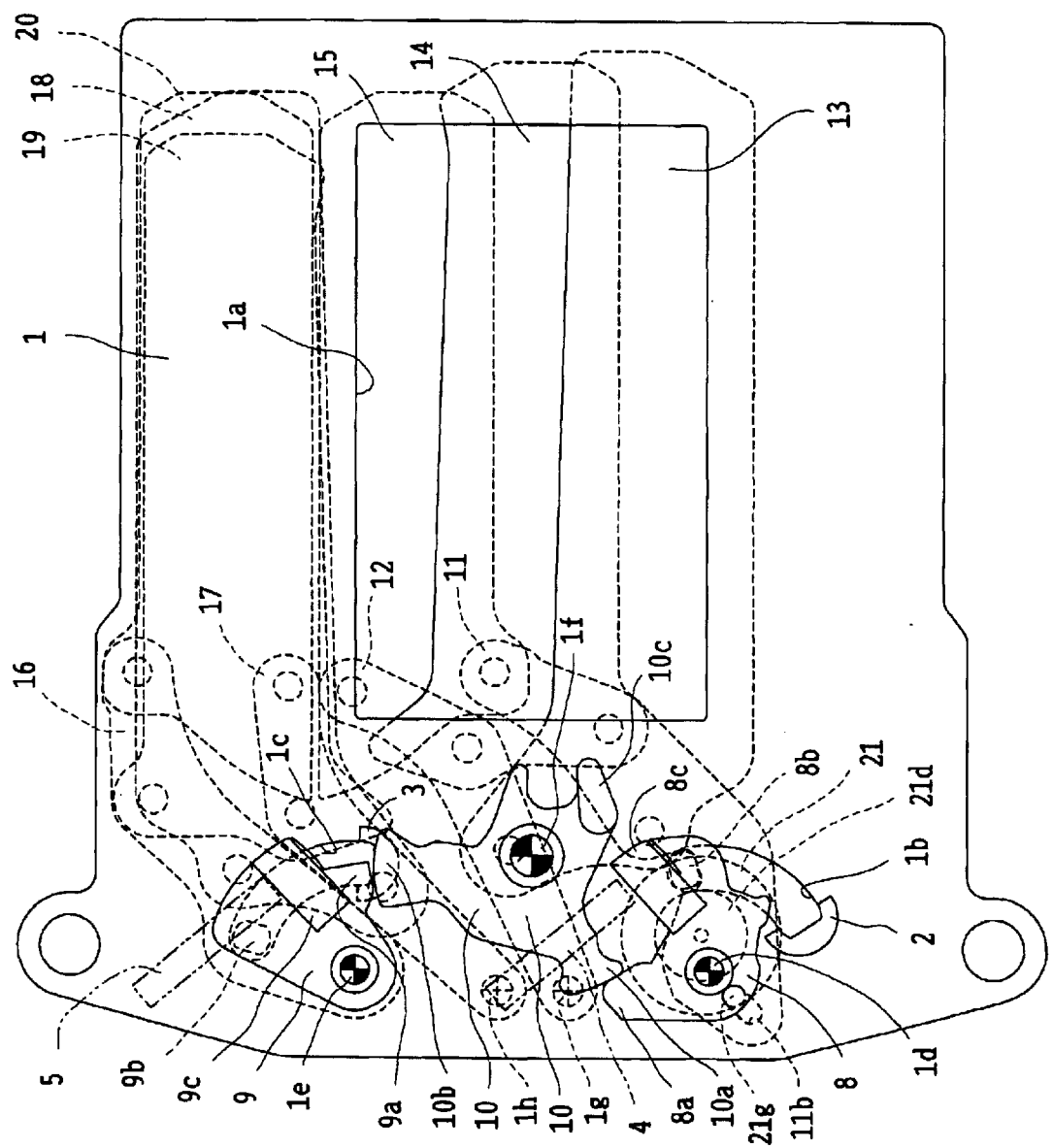
FIG. 7 is a plan view which illustrates a set state in a case of taking a picture with the normally-closed method according to the first embodiment.
Figure 8:
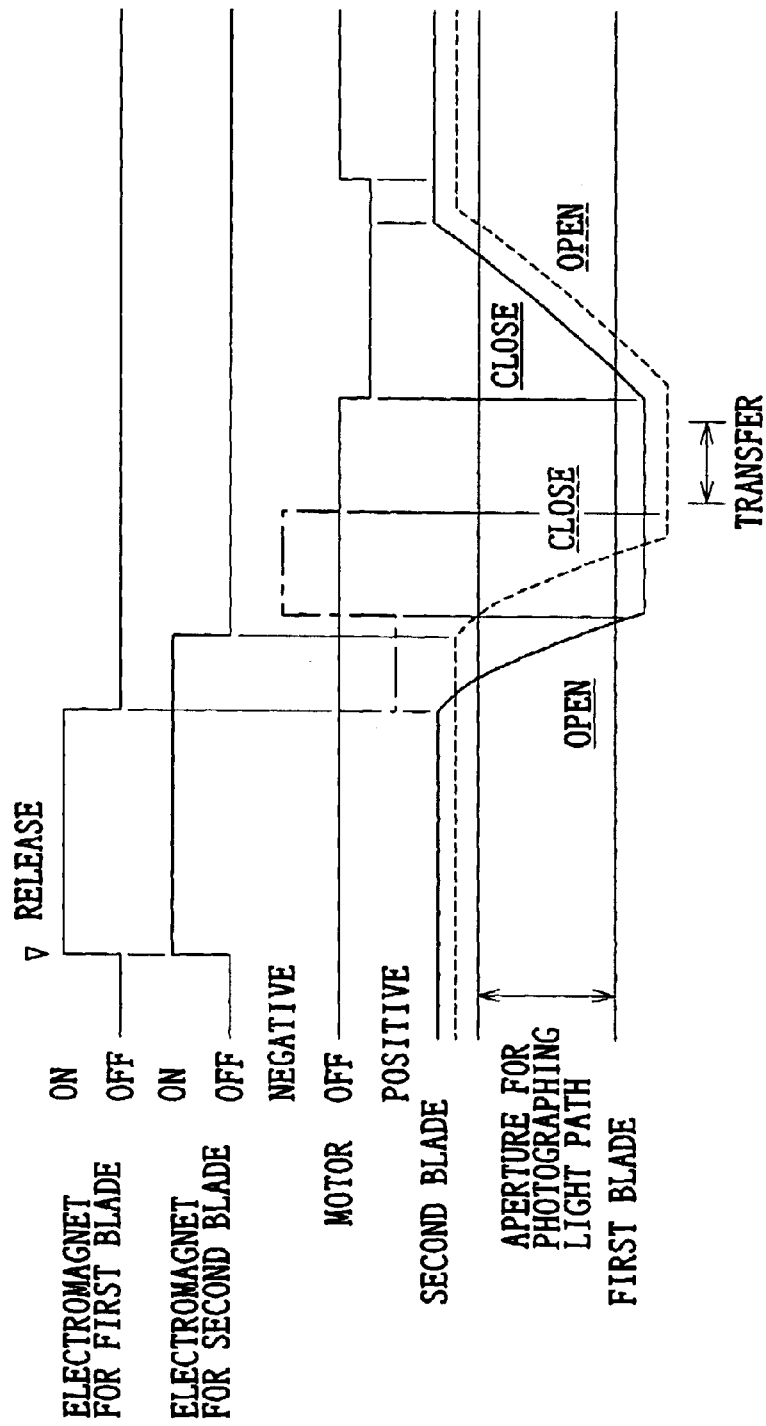
FIG. 8 is a timing chart which indicates the relation between a series of electric control and action of two shutter blades in a case of taking a picture with the normally-closed method according to the first embodiment.

So far, description has been made regarding the operations with the normally-open method. Next, description will be made regarding the operations in a case of taking a picture with the normally-closed method with reference to FIGS. 7 and 8. In this case, part of the operations are the same as with the above-described embodiment, so description will be made with reference to the part of the same drawings as with the normally-open method, as appropriate. Also, detailed description regarding the same action will be omitted, and description thereof will be made as brief as possible. FIG. 7 illustrates the set state in a case of taking a picture with the normally-closed method. Here, reference numeral is omitted for the pressed portion 11a of the arm 11 as with FIG. 4.

In FIG. 7, the first-blade driving member 8, the second-blade driving member 9, and the set member 10, are in completely the same state as in FIG. 1. Accordingly, the three blades 18 through 20 of the second blade are stored at the upper portion of the aperture 1a with these blades being overlaid with each other. However, only the first blade is in the state shown in FIG. 4. At this time, the unshown electromagnet for first blade and electromagnet for second blade are off. However, the first blade is kept in the state. The reason is the same as with a case of the state shown in FIG. 4 wherein even in the event of turning off the coil 21b of the motor 21, the first blade is kept in the state shown in FIG. 4. Accordingly, in such a set state, in general, the user observe the subject through the optical finder.

In this set state, the electric power of the camera is turned on, and upon pressing the release button of the camera for taking a picture, a current is applied to the unshown electromagnet for first blade and electromagnet for second blade. Accordingly, the unshown iron-piece members mounted to the first-blade driving member 8 and the second-blade driving member 9 are attracted and held by the iron cores 4 and 5, respectively. Subsequently, the unshown member on the side of the camera main unit is retracts from the pressed portion 10c of the set member 10, and accordingly, the set member 10 is rotated in the counterclockwise direction by the force from the unshown return spring, whereby the set member 10 returns to the initial position. As a result, all the components are completely in the same state as in FIG. 4. Also, as already described above, while an arrangement may be made wherein prior to the start of exposure action of the first blade, a positive current is applied to the coil 21b of the motor 21 so that the arm 11 is forced in the counterclockwise direction, even in such a case, an arrangement has the advantage of saving electric power, wherein the application of the positive current to the coil 21b is not made at the same time of turning on each electromagnet, but is delayed as possible.

As described above, with all the components being in the state shown in FIG. 4, first of all, a current is turned off for the electromagnet for first blade, and subsequently, a current is turned off for the electromagnet for second blade. As described above, in the event that a positive current is applied to the coil 21b of the motor 21, in an ideal arrangement, application of the positive current to the coil 21b is performed at the time of turning off the electromagnet for first blade, as denoted by the alternate long and short dashed line shown in FIG. 8. However, in the event that such an arrangement cannot be employed, the application of the positive current to the coil 21b is preferably performed somewhat prior to the point in time. Subsequently, upon turning off each electromagnet, while exposure is performed on the imaging face of the imaging device through a slit formed by the slit forming blade 15 of the first blade and the slit forming blade 20 of the second blade, the processing from the start up to the end of the exposure action is performed as already described above. Accordingly, with regard to the final stage of the exposure action of the first blade, an arrangement may be made wherein a negative current is applied to the coil 21b of the motor 21 as denoted by the alternate long and short dashed line shown in FIG. 8. Immediately following the end of the exposure action, the state becomes as shown in FIG. 5. In this state, the imaging information is transmitted to the recording device, immediately following which set action is started.

With the set action, while the set member 10 is pressed by the member on the side of the camera main unit so as to rotate in the clockwise direction, at this time, a positive current is applied to the coil 21b of the motor 21, as well, so that the rotator 21d is rotated in the counterclockwise direction. Accordingly, first of all, the pressing portion 10a of the set member 10 presses the pressed portion 8a of the first-blade driving member 8, and upon the first-blade driving member 8 being rotated in the counterclockwise direction against the force from the unshown first-blade driving spring, the arm 11 rotates in the counterclockwise direction following the driving pin 8b. Thus, the blades 13 through 15 of the first blade are moved upward while reducing the overlap with the blades on top of each other.

Upon the overlap between the slit forming blade 15 of the first blade and the slit forming blade 20 of the second blade reaching a predetermined amount, the pressing portion 10b of the set member 10 presses the pressed portion 9a of the second-blade driving member 9, whereby rotation of the second-blade driving member 9 is started in the counterclockwise direction against the force from the unshown second-blade driving spring. Thus, the arm 16 is rotated in the counterclockwise direction by the driving pin 9b of the second-blade driving member 9, whereby the blades 18 through 20 of the second blade are moved upwards while increasing the overlap of these blades on top of each other. Subsequently, the blades 18 through 20 of the second blade are stored at the upper portion of the aperture 1a with these blade being overlaid with each other, and upon the unshown iron-piece members mounted to each of driving members 8 and 9 coming into contact with the iron cores 4 and 5, respectively, rotation of the set member 10 due to the unshown member on the side of the camera main unit is stopped. Subsequently, a current is turned off for the coil 21b of the motor 21, thereby returning to the set state shown in FIG. 7.

With the configuration of the present embodiment, the first blade is disposed in the blade room on the side of the imaging device, and the second blade is disposed in the blade room on the side of the photography lens. Note that the present invention is not restricted to an arrangement having such a configuration, but rather, an arrangement may be made wherein the first blade is disposed in the blade room on the side of the photography lens, depending upon the kind of shutter, as disclosed in Japanese Unexamined Patent Application Publication No. 2002-55379.

Second Embodiment

Figure 9:
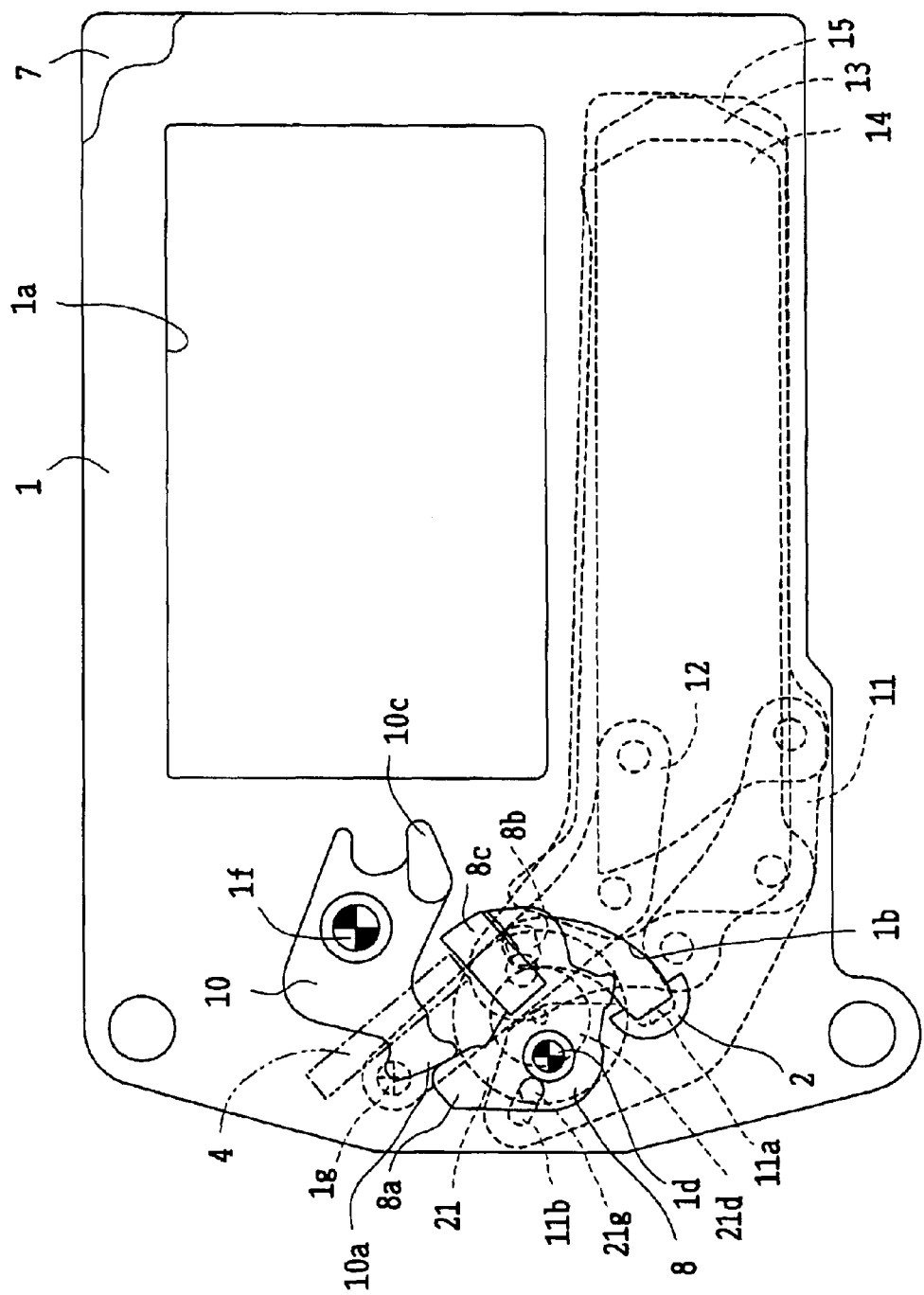
FIG. 9 is a plan view which illustrates a set state in a case of taking a picture with the normally-open method according to a second embodiment of the present invention.
Figure 10:
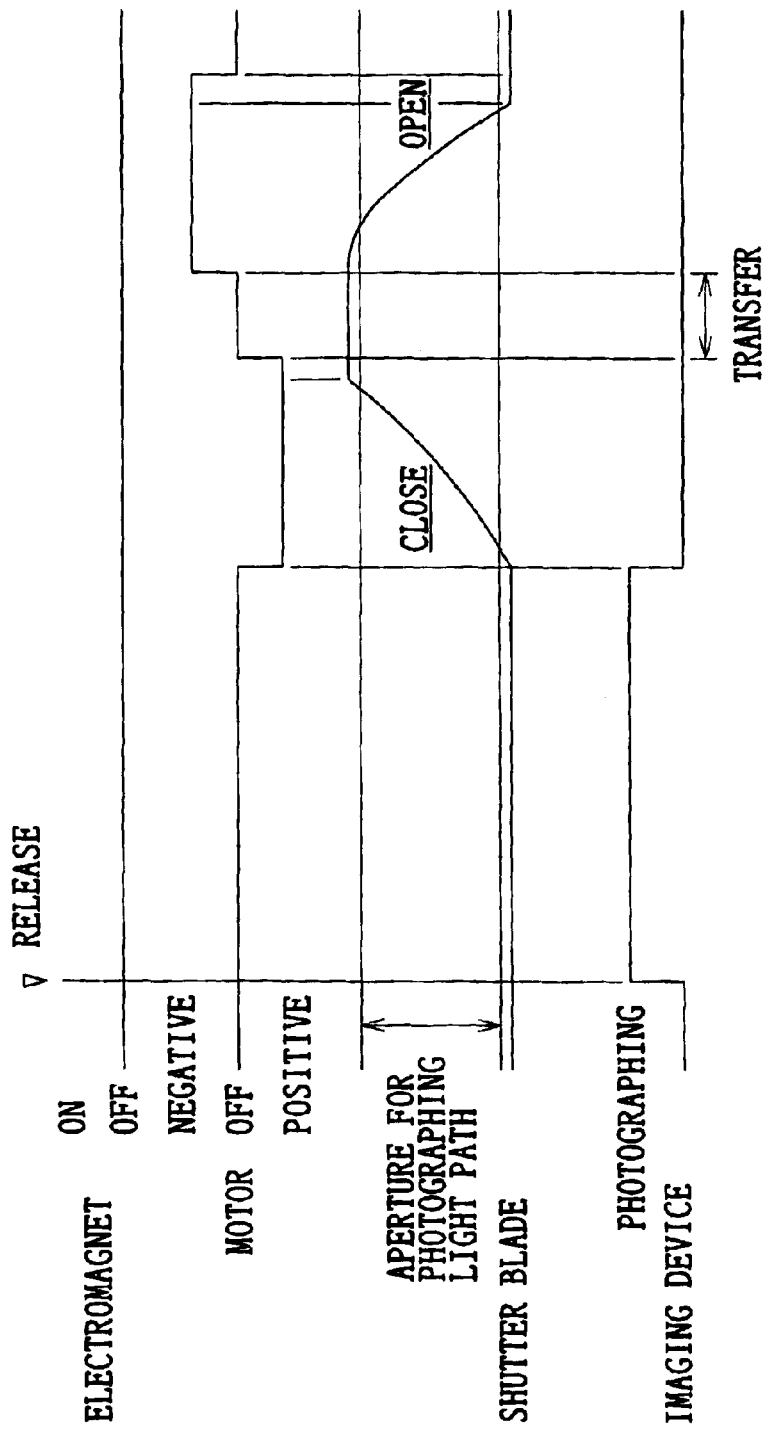
FIG. 10 is a timing chart which indicates the relation between a series of electric control and action of two shutter blades in a case of taking a picture with the normally-open method according to the second embodiment.
Figure 11:
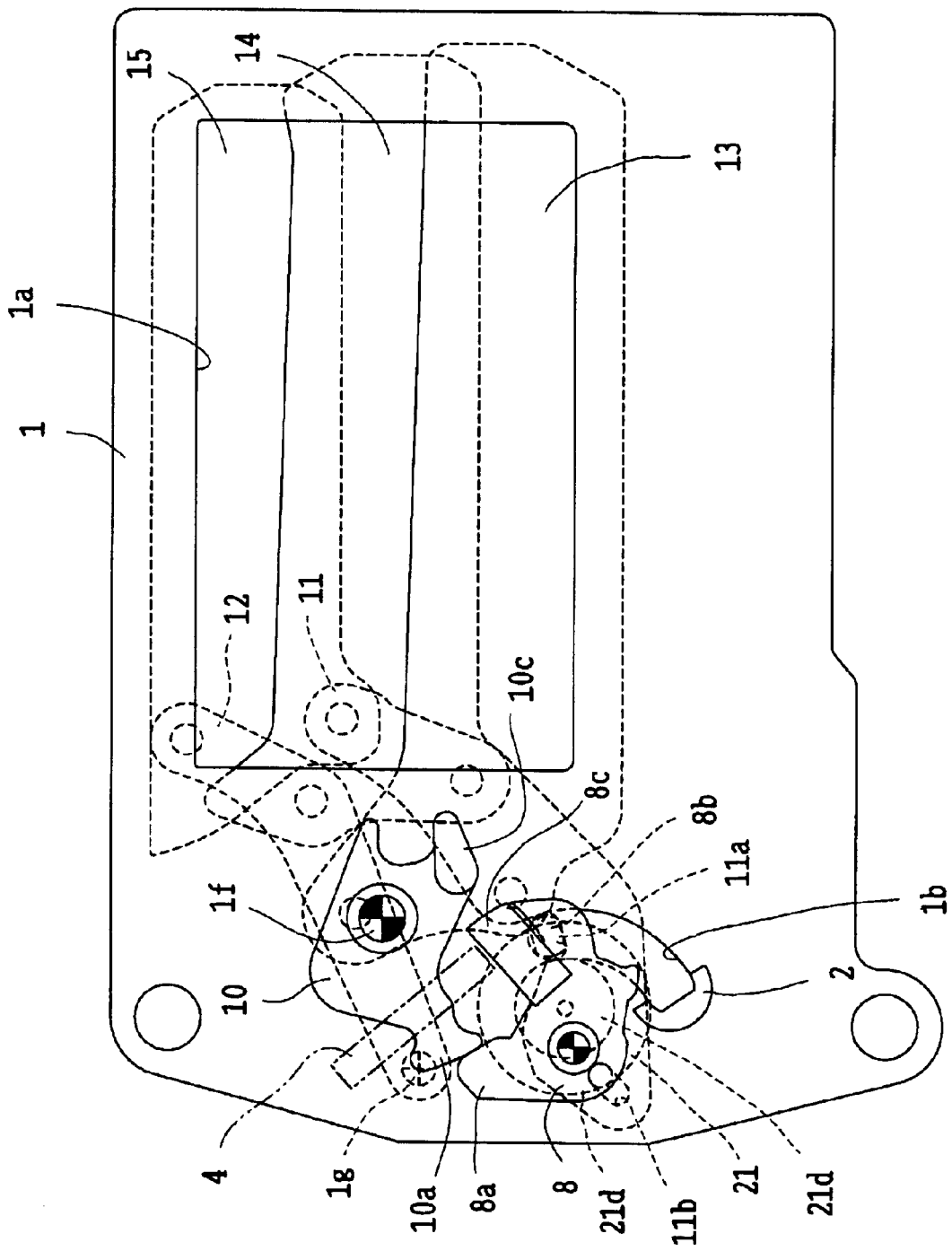
FIG. 11 is a plan view which illustrates a set state in a case of taking a picture with the normally-closed method according to the second embodiment.

Description will be made regarding to a second embodiment with reference to FIGS. 9 through 12. Of these, FIGS. 9 and 10 are diagrams for describing a case of taking a picture with the normally-open method. FIG. 9 is a plan view which illustrates the set state, and FIG. 10 is a timing chart which indicates the relation between a series of electric control and a series of action of the shutter blades. Furthermore, FIGS. 11 and 12 are diagrams for describing a case of taking a picture with the normally-closed method, wherein FIG. 11 is a plan view which illustrates the set state, and FIG. 12 is a timing chart which indicates the relation between a series of electric control and a series of action of the shutter blades. Note that in description regarding any method, description will be made with reference to a part of the drawings already referred to.

First of all, description will be made regarding a configuration of the present embodiment with reference to FIG. 9. The configuration of the present embodiment is a configuration which is essentially the same as that of the first embodiment but with the second blade and the components necessary for operating the second blade removed. That is to say, with the configuration of the present embodiment, only one shutter blade is provided, and accordingly, is not classified into the first blade and the second blade. Accordingly, in description of the present embodiment, the shutter blade of the present embodiment is simply referred to as "shutter blade". However, the configuration of the shutter blade is completely the same as with the first embodiment, and accordingly, the same component are denoted by the same reference numerals.

Furthermore, with the present embodiment, the intermediate plate 6 is not provided, unlike the first embodiment, and the shutter blade is disposed at a position between the shutter base plate 1 and the auxiliary base plate 7. The sizes of the base plates 1 and 7 are reduced due to the space for storing the second blade being unnecessary as compared with the first embodiment. Furthermore, with the second embodiment, the second-blade driving member 9 according to the first embodiment is removed, and accordingly, the set member 10 does not have the pressing member 10b and the iron core 5. Other components are the same as with the first embodiment, and so are denoted by the same reference numerals. Note that, for the above-described reason, with the present embodiment, the first-blade driving member 8 according to the first embodiment is referred to as "driving member 8", the first-blade driving spring according to the first embodiment is referred to as "driving spring", and the electromagnet for first blade according to the first embodiment is referred to as "electromagnet".

Next, description will be made regarding to the operation of the present embodiment. Note that with regard to the action which can be fully understood from the description of the operation of the first embodiment, description thereof will be made in brief to avoid repetition. With the present embodiment, photography can be performed with both the normally-open method and the normally-closed method, as with the first embodiment. Furthermore, with the present embodiment, two different actions can be performed for each of the above-described two method, i.e., the normally-open method and the normally-closed method. First of all, description will be made in order, regarding the two actions in a case of taking a picture with the normally-open method, with reference to FIGS. 9 and 10.

FIG. 9 illustrates the set state in a case of taking a picture with the normally-open method. At this time, the set member 10 is prevented from returning to the initial position by the unshown member on the side of the camera main unit. Accordingly, the driving member 8 is prevented from rotating in the clockwise direction due to the force from the unshown driving spring by the pressing portion 10a of the set member 10, and the unshown iron-piece member mounted to the mounting portion 8c is into contact with the iron core 4 of the electromagnet. Furthermore, at the same time, the shutter blade is forced so that the arm 11 is rotated in the clockwise direction for the reason as with the operation of the first embodiment as described above, and the pressed portion 11a and the driving pin 8b of the driving member 8 are not into contact with each other. Accordingly, the blades 13 through 15 of the shutter blade are stored at the lower portion of the aperture 1a with these blades being overlaid with each other.

First of all, description will be made regarding a first action method in a case of taking a picture with the normally-open method with reference to FIG. 10. In the set state shown in FIG. 9, the electric power of the camera is turned on, the user confirms the object on the monitor, and upon pressing the release button, the image of the object is formed on the imaging face of the imaging device, immediately following which photography is started according to electric control. Accordingly, in this case, a current is not applied to the coil of the electromagnet, and the set member 10 is kept in the state shown in FIG. 9. Subsequently, upon a signal for ending of the photography, i.e., for ending exposure by closing the shutter, being output following a predetermined time period, a positive current is applied to the coil 21b of the motor 21 according to the signal so that the arm 11 is rotated in the counterclockwise direction by the rotator 21d. Thus, the three blades 13 through 15 are moved upward while reducing the overlap of these blades on top to each other, and immediately following these blades completely covering the photography optical path, the pressed portion 11a of the arm 11 comes into contact with the driving pin 8b of the driving member 8, whereby these blades are stopped.

Subsequently, as shown in FIG. 10, the current, which has been applied to the coil 21b of the motor 21, is turned off, and the imaging information is transmitted to the recording device. However, the transmission time period is relatively short, and accordingly, an arrangement may be made wherein a current is continuously applied to the coil 21b of the motor 21 during the transmission time period. As described above, following the aforementioned transmission of imaging information, a negative current is applied to the coil 21b of the motor 21 so that the stator 21d is rotated in the clockwise direction. Accordingly, the arm 11 is rotated in the clockwise direction, as well, and accordingly, the three blades 13 through 15 are moved downward while increasing the overlap of the blades on top to each other, whereby the photography optical path is opened. Subsequently, the shutter blade is stopped by the arm 11 coming into contact with the unshown stopper. Subsequently, upon the coil 21b of the motor 21 being turned off, the state shown in FIG. 9 is obtained. Thus, in a case of taking a picture with the first action method, the driving member 8 and the set member 10 do not act at all.

Next, description will be made regarding the other action method in a case of taking a picture with the normally-open method. In this case, the set state is the same as shown in FIG. 9. In this state, the user confirms the subject image, and upon pressing the release button of the camera, first of all, a current is applied to the unshown coil of the electromagnet, unlike the above-described first action method. Accordingly, the unshown iron-piece member mounted to the driving member 8 is attracted to and held by the iron core 4. Subsequently, upon the set member 10 returning to the initial position, photography (exposure) is started according to electric control. Note that with the present embodiment, unlike the first embodiment, the shutter blade does not contribute to the control of the exposure time period, and is provided for preventing occurrence of smear, and accordingly, an arrangement may be made wherein photography is started prior to returning of the set member 10 to the initial position as described above.

Upon the signal for the end of the photography being output following a predetermined time period, a current is applied to the coil 21b of the motor 21, whereby the arm 11 is rotated in the counterclockwise direction by the rotator 21d. Accordingly, the three blades 13 through 15 are moved upward while reducing the overlap of these blades on top of each other, and following these blades completely covering the photography optical path, the blades are stopped by the pressed portion 11a of the arm 11 coming into contact with the driving pin 8b. Subsequently, the current is turned off for the coil 21b of the motor 21, and at the same time, image information is transmitted to the recording device, following which the current is turned off for the coil of the electromagnet, and accordingly, the driving member 8 is rapidly rotated in the clockwise direction by the force from the unshown driving spring, whereby the driving pin 8b presses the pressed portion 11a so that the arm 11 is rotated in the clockwise direction. Thus, the arm 11 is rotated in the clockwise direction, as well, and accordingly, the blades 13 through 15 are moved downward while increasing the overlap of these blades on top of each other, whereby the photography optical path is opened.

Subsequently, upon the photography optical path completely being opened, the driving member 8 is stopped by the driving pin 8b thereof coming into contact with the cushion member 2, and the shutter blade is stopped by the arm 11 coming into contact with the unshown stopper. Accordingly, in the event that the shutter might be destroyed due to intense bounding, an arrangement wherein a negative current is applied to the coil 21b of the motor 21 prior to stopping so that the rotator 21d is forced to rotate in the clockwise direction as described in the first embodiment exhibits effective results. Subsequently, upon the set member 10 being rotated in the clockwise direction by the unshown member on the side of the camera main unit pressing the pressed portion 10c of the set member 10, the pressed portion 8a of the driving member 8 is pressed by the pressing portion 10a, whereby the driving member 8 is rotated in the counterclockwise direction against the force from the unshown driving spring. Subsequently, upon the unshown iron-piece member mounted to the driving member 8 coming into contact with the iron core 4, rotation of the set member 10 is stopped; whereby the state is returned as shown in FIG. 9. The state is kept until the following photography is started.

As can be understood from the above description, with the second action method, the action of shutter opening can be rapidly performed, and thus, the user can observe the subject on the monitor with little unpleasant sensations. Furthermore, an arrangement can prevent deterioration of the sensitivity of the imaging device, wherein in the event that the user stops taking pictures and the electric power of the camera is turned off, a positive current is applied to the coil 21b of the motor 21 so that the rotator 21d is rotated in the counterclockwise direction, whereby the photography optical path is closed by the three blades 13 through 15, which also holds good for the above-described first action method. Note that it is needless to say that there is the need for the motor 21 to completely open the shutter blade upon the camera being turned on prior to taking a picture. Furthermore, in the event that the speed of rotation of the rotator 21d of the motor 21 is sufficient, an arrangement may be made wherein the photography time ends by the action of the shutter blade closing.

Next, description will be made in order regarding the two actions in a case of taking a picture with the normally-closed method, referring to FIGS. 11 and 12. FIG. 11 illustrates the set state in a case of taking a picture with the normally-closed method. At this time, the driving member 8 and the set member 10 are in the same state as in a case of the normally-open method shown in FIG. 9. However, the shutter blade is in the state wherein the pressed portion 11a of the arm 11 is into contact with the driving pin 8b, and the three blades 13 through 15 close the photography optical path with the blade being spread. At this time, although a current is not applied to the coil 21b of the motor 21, the above-described state is kept due to the reason described in the description of the operations of the first embodiment with reference to FIG. 4.

First of all, description will be made regarding a first action method in a case of taking a picture with the normally-closed method with reference to FIG. 12. In the set state shown in FIG. 11, the user confirms the subject through the optical finder, and upon pressing the release button, first of all, a current is turned on for the coil of the unshown electromagnet. Accordingly, the unshown iron-piece member mounted to the driving member 8 is attracted to and held by the iron core 4. Subsequently, upon the set member 10 returning to the initial position, a current is turned off for the coil of the electromagnet, whereby the driving member 8 is rapidly rotated in the clockwise direction by the force from the driving spring. Thus, the arm 11 is rotated in the clockwise direction by the driving pin 8b, as well, and accordingly, the three blades 13 through 15 are moved downward while increasing the overlap of the blades on top of each other, whereby the photography optical path is closed.

Subsequently, upon the photography optical path completely being opened, the driving member 8 is stopped by the driving pin 8b thereof coming into contact with the cushion member 2, and the shutter blade is stopped by the arm 11 coming into contact with the unshown stopper. At this time, in the event that the shutter blade might be destroyed due to intense bounding, an arrangement wherein a negative current is applied to the coil 21b of the motor 21 prior to the stop so that the rotator 21d is forced so as to rotate in the clockwise direction, as shown by an alternate long and short dashed line in FIG. 12, exhibits effective results. Regarding the timing for applying the negative current, an arrangement may be made wherein the negative current is applied from a point in time between the point at which the shutter blade opens the photography optical path and the point at which the shutter is stopped, as shown in FIG. 12. Furthermore, an arrangement may be made wherein the negative current is applied from a point prior to the shutter blade completely opening the photography optical path. Subsequently, following the photography optical path completely being opened, photography is started according to electric control. Following the end of the photography, the unshown member on the side of the camera main unit presses the pressed portion 10*c* of the set member 10 according to the signal, whereby the set member 10 is rotated in the clockwise direction. Thus, the set member 10 presses the pressed portion 8*a* of the driving member 8 through the pressing portion 10*a*, whereby the driving member 8 is rotated in the counterclockwise direction against the force from the unshown driving spring.

On the other hand, a positive current is applied to the coil 21*b* of the motor 21 so that the rotator 21*d* is rotated in the counterclockwise direction at the same time as, or somewhat prior to, the above-described rotation of the driving member 8 in the counterclockwise direction. Thus, the arm 11 is rotated in the counterclockwise direction with the driving pin 8*b* being into contact with the pressed portion 11*a*, and the three blades 13 through 15 are moved upward while reducing the overlap of these blades on top of each other, whereby the photography optical path is closed. Subsequently, upon the unshown iron-member mounted to the driving member 8 coming into contact with the iron core 4, rotation of the set member 10 is stopped, whereby the state is returned as shown in FIG. 11. This state is maintained until shooting of the following photograph is started.

Next, description will be made regarding a second action method for taking a picture with the normally-closed method. In this case, the set state is the same as shown in FIG. 11. In this state, the user confirms the subject image, and upon pressing the release button of the camera, a current is not applied to the coil of the electromagnet as described above, and a negative current is applied to only the coil 21*b* of the motor 21 so that the rotator 21*d* is rotated in the clockwise direction. Accordingly, the arm 11 is rotated in the clockwise direction, and thus, the three blades 13 through 15 are moved downward while increasing the overlap of the blades on top of each other, whereby the photography optical path is opened. Subsequently, following the photography optical path being completely opened, upon the action of the shutter blade being stopped by the arm 11 coming into contact with the unshown stopper, the current is turned off for the coil 21*b* of the motor 21, and photography is started according to electric control for the imaging device.

Subsequently, upon the signal for the end of the photography being output following a predetermined time period, a positive current is applied to the coil 21*b* of the motor 21 according to the signal, whereby the arm 11 is rotated in the counterclockwise direction by the rotator 21*d*. Accordingly, the three blades 13 through 15 are moved upward while reducing the overlap of the blades on top of each other, and immediately following the blades completely covering the photography optical path, the blades are stopped by the pressed portion 11*a* of the arm 11 coming into contact with the driving pin 8*b* of the driving member 8. Subsequently, the imaging information is transmitted to the recording device with the photography optical path being closed, and the state returns to the set state shown in FIG. 11. Thus, in a case of taking a picture with the present action method, the driving member 8 and the set member 10 do not act at all.

As described above, with the present embodiment, the focal-plane shutter has only one shutter blade. That is to say, the present embodiment has a configuration wherein only the first blade according to the first embodiment and the components necessary for operating the first blade are employed. Accordingly, the driving force from the driving member 8 is applied so that the shutter blade is forced so as to open the photography optical path. On the other hand, according to the present invention, an arrangement may be made wherein only the second blade according to the first embodiment and the components necessary for operating the first blade are employed. In this case, a configuration should be employed wherein a pressed portion and a slot, corresponding to the pressed portion 11*a* and the slot 11*b* formed on the arm 11, respectively, are formed on the arm 16, and the motor 21 is mounted so as to be connected to the arm 16. Accordingly, in this case, the driving force from the driving member 9 is applied so that the shutter blade is forced so as to close the photography optical path. Note that with such a configuration, the shutter actions in a case of taking picture with the normally-open method and the normally-closed method can be easily understood from the description regarding the operation of the present embodiment, so specific description will be omitted.

As described above, with each embodiment, while description has been made regarding an arrangement wherein a shutter blade set is made up of two arms and three blades, with the present invention, an arrangement may be made wherein a shutter blade set has three arms, and the present invention is not restricted to an arrangement wherein a shutter blade set has three blades. Examples of the focal-plane shutter employed for digital still cameras include an arrangement wherein only one blade is employed. Furthermore, while with the above-described each embodiment, the arm 11 is moved by the driving member 8 and the motor 21, an arrangement may be made wherein one of the arms 11 and 12 is moved by the driving member 8, and the other is moved by the motor 21. Furthermore, in a case of a digital still camera, an arrangement may be made wherein the shutter base plate 1 and the auxiliary base plate 7 are mounted on the camera main unit with the shutter base plate 1 being on the side of the imaging device, and the auxiliary base plate 7 being on the side of the photography lens. Accordingly, the present invention is not restricted to an arrangement wherein the shutter base plate 1 is disposed on the side of the photography lens. Furthermore, while with the above-described embodiments, the motor is a moving-magnet motor, the present invention is not restricted to an arrangement wherein the motor having such a configuration is employed, and a stepping motor or the like may be employed.

Furthermore, as a configuration for holding a driving member until rotation is started by the force from a driving spring, employed in the focal-plane shutter, a configuration which is referred to as "direct type" and a configuration which is referred to as "engaging type", are known. While with the aforementioned embodiments, description has been made regarding an arrangement having a configuration of the direct type wherein the iron-piece member of the driving member is directly attracted to and held by the electromagnet, the present invention can be applied to an arrangement having a configuration of the engaging type wherein a driving member mechanically engages with an engaging member, as well.

What is claimed is:

1. A focal-plane shutter for a digital still camera comprising:
    a first base plate having a first aperture for a photography optical path;
    a second base plate, having a second aperture for a photography optical path which matches said first aperture, for forming a blade room between said first base plate and said second base plate;
    a plurality of arms mounted on one of said first and second base plates;
    a shutter blade made up of one or more blades, supported by said plurality of arms, which is reciprocally moved between a first position where said shutter blade is retracted from said photography optical path and a second position where said shutter blade covers said photography optical path in said blade room;
    a driving member, mounted on said first base plate outside said blade room, which presses one of said arms only at the time of action by the force from a driving spring so that said shutter blade is moved in a first direction;
    a motor, mounted on said second base plate outside said blade room, which moves said shutter blade in said first direction and in a second direction, through one of said plurality of arms corresponding to reciprocal rotation of the stator of said motor;
    a set member, mounted on said first base plate outside said blade room, which moves from an initial position so that said driving member is moved to a set position against the force from said driving spring; and
    holding means which hold said driving member at a set position at least during movement of said set member for returning to said initial position, with the holding force thereof being released during the movement of said shutter blade by the force from said driving spring.

2. A focal-plane shutter for a digital still camera according to claim 1, wherein said arm which is moved by said driving means and said arm which is moved by said motor, are the same arm.

3. A focal-plane shutter for a digital still camera according to claim 1 or claim 2, wherein a current is continuously applied to said motor so that said shutter blade is forced so as to move in said second direction from the point in time at which the movement of said shutter blade in said second direction is started, up to the point in time at which said shutter blade reaches the position where said arms of said shutter blade can be pushed, following which a predetermined time period elapses.

4. A focal-plane shutter for a digital still camera according to claim 1 or claim 2, wherein a current is applied to said motor so that said shutter blade is forced so as to move in said first direction, from the point in time at which the movement of said shutter blade in said first direction is started, at least up to the point in time at which said shutter blade is stopped at a first position by coming into contact with a stopper.

5. A focal-plane shutter for a digital still camera according to claim 1 or claim 2, further comprising:
    an intermediate plate, having a third aperture which matches said first and second apertures for said photography optical path, which partitions a space between said first base plate and said second base plate into two blade rooms so that said shutter blade is disposed in one of said two blade rooms;
    a second shutter blade, made up of one or more blades and supported by a plurality of arms mounted on one of said two base plates, which is reciprocally moved between a first position where said shutter blade covers said photography optical path and a second position where said shutter blade is retracted from said photography optical path in the other blade room or said two blade rooms;
    a second driving member, mounted on said first base plate outside said blade room, which moves said second shutter blade in a first direction at the time of being moved by the force from a second driving spring, and moves said second shutter blade in a second direction at the time of being moved to a set position by said set member against the force from said second driving spring; and
    second holding means which hold said second driving member at said set position at least during movement of said set member for returning to said initial position, with the holding force thereof being released during the movement of said second shutter blade by the force from said second driving spring.

6. A focal-plane shutter for a digital still camera according to claim 3, further comprising:
    an intermediate plate, having a third aperture which matches said first aperture and said second aperture for said photography optifcal path, which partitions a spare between said first base plate and said second base plate into two blade rooms so that said shutter blade is disposed in one of said two blade rooms;
    a second shutter blade, made up of one or more blades and supported by a plurality of arms mounted on one of said two base plates, which is reciprocally moved between a first position where said shutter blade covers said photography optical path and a second position where said shutter blade is refracted from said photography optical path in the other blade room of said two blade rooms;
    a second driving member, mounted on said first base plate outside said blade room, which moves said second shutter blade in a first direction at the time of being moved by the force from a second driving spring, and moves said second shutter blade in a second direction at the time of being moved to a set position by said set member against the force from said second driving spring; and
    second holding means which hold said second driving member at said set position at least during movement of said set member for returning to said initial position, with the holding force thereof being released during the movement of said second shutter blade by the force from said second driving spring.

7. A focal plane shutter for a digital still camera according to claim 4, further comprising:
    an intermediate plate, having a third aperture which matches said first aperture and said second aperture for said photography optical path, which partitions a space between said first base plate and said second base plate into two blade rooms so that said shutter blade is disposed in one of said two blade rooms;
    a second shutter blade, made up of one or more blades and supported by a plurality of arms mounted on one of said two base plates, which is reciprocally moved between a first position where said shuter blade covers said photography optical path and a secondposition where said shutter blade is refracted from said photography optial path in the other blade room of said two blade rooms;

a second driving member, mounted on said first base plate outside said blade room, which moves said second shutter blade in a first direction at the time of being moved by the force from a second riving spring, and moves said second shutter blade in a second direction at the time of being moved to a set position by said set member against the force from said second driving spring; and second holding means which hold said second driving member at said set position at least during movement of said set member for returning to said initial position, with the holding force thereof being released during the movement of said second shutter blade by the force from said second driving spring.

8. A focal-plane shutter for a digital still camera according to claim 5, wherein said shutter blade is a first blade, and said second shutter blade is a second blade.

9. A focal-plane shutter for a digital still camera according to claim 7, wherein said shutter blade is a first blade, and said second shutter blade is a second blade.

* * * * *